United States Patent Office 3,087,827
Patented Apr. 30, 1963

3,087,827
MICACEOUS FLAKE PIGMENT
Edward F. Klenke, Jr., Summit, and Arthur J. Stratton, Upper Montclair, N.J., assignors to E. I. du Pont de Nemours and Company, Wilmington, Del., a corporation of Delaware
No Drawing. Filed June 28, 1961, Ser. No. 120,155
9 Claims. (Cl. 106—291)

This invention relates to new pigment compositions.

There are many types of pigments recognized in the prior art. Among such pigments, attention may be drawn to the opaque, high-hiding power pigments typified, for instance, by titanium dioxide as a white pigment and by the various iron oxides as colored pigments. It is well recognized that the particle size of such pigments has a profound effect upon their value as pigments, as exhibited in the appearance of compositions in which these pigments are dispersed. Such pigments are generally composed of small irregular particles which behave as small spheres in their interaction with light. To achieve the optimum of opacity and hiding power, the particle size of such pigments is controlled to result in the maximum scattering of the incident light by coating compositions containing these pigments. It has been shown by both theoretical calculations and by practical tests that a curve relating the light-scattering function to particle size rises very sharply as the particle size increases from about 0.1 micron to about 0.2 micron. At 0.2–0.3 micron, there is usually a maximum scattering and then, as the particle size increases further, a rather abrupt drop in scattering power.

Thus, the optical units of prior art high-hiding colored and white pigments are generally particles of irregular shape, in the order of 0.2 to 0.3 micron in diameter, which refract and scatter light in substantially the same manner as spheres of very small size. A light beam which falls upon a surface pigmented with such optical units is refracted by each particle it encounters in a completely random manner and the light is ultimately, in effect, reflected from the film in a random scattering. In the case of colored pigments, some of the wave lengths of light are absorbed so that the reflected light is composed of the remaining wave lengths of light and is thereby colored. In the prior art manufacture of such pigments, it has been a principal aim to maximize the random light scattering by control of particle size and shape.

Another class of pigments widely used in the prior art may be designated under the general term "flake pigments." In one of the oldest uses of such pigments, the flakes are used as reinforcing and protective pigments wherein the flake-like particles are oriented in a leafing or overlapping fashion, more or less parallel to the surface of the paint or other film, and thus create a physical barrier to the penetration of the film by deleterious agents as well as providing a reinforcing effect. Water-ground white mica in small sizes (200–325 mesh) has been widely used for this purpose. It is substantially colorless and its refractive index (about 1.55) is essentially the same as that of the common paint vehicles; thus it has a negligible effect on the visual properties of the film. However, when used in low-refractive-index vehicles or when partially exposed to the air, mica has a reflective and sparkling effect and has, on some occasions, been used for this effect.

Atwood in U.S. Patent 2,278,970 has combined the reinforcing effect of mica with the high-hiding-power properties of other pigments, such as titanium dioxide, to give a composite pigment which is said to be an intimate association of mica with another pigment, exhibiting the general properties of the second pigment, but without the sparkling effect of the mica. In order to hide the sparkle of the mica and to obtain the general appearance of the second pigment, the particle size of this second pigment must be such as to result in a maximum, or a near-maximum, scattering of light. In the case of titanium dioxide, particles in the 0.2–0.3 micron size range are necessary to achieve this result.

Other types of flake pigments include metal flakes, especially aluminum in various particle sizes, which have been used both for the purpose of reinforcing effects and for the essentially opaque character and shiny surfaces of such flakes, giving a film with the appearance of a metal surface.

Metal flake pigments, such as aluminum, have also found wide use because of their decorative effect, especially when mixed with other pigments, to give the well-known "metallized" appearance of many automotive finishes. Despite their desirable appearance, such metallized finishes have certain well recognized defects, including a tendency to water spot, which is a persistent discoloration of the finish when water is allowed to stand on it in drops, especially when the water is slightly alkaline as from a detergent. It is also common to find that a mixture of aluminum flakes with a colored pigment is less lightfast than the colored pigment alone.

A third and more specialized use of certain flake pigments is to create finishes with a nacreous or pearl-like effect simulating the appearance of mother of pearl with its three dimensional effect of luster in the depth of the film. Pigments having this effect are non-opaque with a high refractive index and vary in nature from an extract of fish scales, essentially the organic compound guanine, to flake-like crystals of certain inorganic salts, notably basic lead carbonate and lead acid phosphate. In spite of their valuable decorative properties, these products have well recognized deficiencies such as:

(1) They cannot, in general, be handled in dry form but must be stored and marketed as dispersions in the selected vehicles in which they will be used.

(2) Their lightfastness does not meet the demands of many outdoor uses.

(3) They are inherently very expensive to manufacture.

(4) The presence of lead compounds is frowned upon in many potential uses.

This invention provides a new group of nacreous flake pigments which can be marketed in a dry, easily dispersible form, which have excellent lightfastness, are generally non-toxic in character and relatively low in cost. They are capable of being incorporated in various compositions to which they impart both desirable nacreous effects and an appearance of pronounced color, the color being derived almost entirely from the optical phenomenon of interference. Furthermore, these products may also be formulated to simulate a metallized appearance completely free from the water spotting so characteristic of finishes based on aluminum flakes. Finally, since they are flake-like in nature and chemically stable, they have added ability to serve as reinforcing pigments.

All pigments exhibiting nacreous effects when dispersed in vehicles have certain common optical and physical characteristics which set them apart from the usual colored pigments and white pigments of commerce. In contrast to the irregularly shaped pigment particles described above which behave optically much like small spheres, nacreous pigments are non-opaque flake-like products in which the optical units are extremely thin flakes, at least about 5 to 10 microns in major diameter and in the range of about 0.1 to 3 microns in thickness. Such optical units minimize the scattering of light and result in direct reflectance or sparkle.

Furthermore, all nacreous pigments must be transparent or translucent in character, and they must exhibit a substantial difference in refractive index from the medium in which they are dispersed. Thus, the common coating composition vehicles, plastics, and the like have refractive indices generally in the range of about 1.5 to 1.6. Those pigments which have been known in the prior art as nacreous pigments have, in general, refractive indices in the range of about 1.8 to 2.6. Most prior art nacreous pigments are thin flakes of a definite chemical compound. These thin flakes, in the presence of a vehicle of low refractive index, exhibit the optical behavior of thin films including light interference and a resultant interference color characteristic of the thickness of the film. However, the prior art flakes exhibit more or less random thicknesses and the average effect is a blending of colors to give a nacreous or pearl-like appearance almost free of distinguishable color.

The optical principles which explain interference colors are well known and are discussed in many textbooks of physical optics such as Robert W. Wood—"Physical Optics—3rd Edition," New York, 1936, page 198. Briefly stated, interference is an optical phenomenon associated with the reflectance of light from the surfaces of thin films, wherein there is a reduction in the intensity of certain wave lengths of the incident light (destructive interference) and reinforcement of other wave lengths (constructive interference). The particular wave lengths affected are dependent upon the thickness of the film and its refractive index. When the thickness is such that a ray reflected from one surface of a film is out of phase with a ray which has passed through the film and been reflected from the other surface, there is destructive interference.

Since there is a phase reversal when light is reflected from a more dense medium, the condition of maximum destructive interference (minimum reflectance) is satisfied when the effective optical path in a film of high refractive index is one wave length or a simple multiple thereof. Considering the refractive index, "N," of the film, the thickness ($t$) thereof for destructive interference with any wave length "λ" is given by the formula $$t = \frac{n\lambda}{2N}$$

where "$n$" is a small whole number usually not greater than 5.

By the same line of reasoning, if the two rays emerge in phase, there is reinforcement or a maximum of reflectance. This condition is satisfied, again assuming phase reversal, when the effective optical path is one half a wave length or an odd multiple thereof, the formula for the the thickness at maximum reflectance being, $$t = (n + \tfrac{1}{2})\frac{\lambda}{2N}$$

where "$n$" is 0 or a small whole number usually not greater than about 5.

When "$n$" is greater than 1, it is common to speak of the interference as a higher order, second order, third order, and the like. For thick films, there are interference bands at various wave lengths in the visible spectrum, and the resultant colors are generally low in intensity.

It is now found that a translucent flake pigment, such as mica, on which has been deposited a thin, adherent, translucent layer of a colorless titanium dioxide (or zirconium dioxide) of a selected small particle size can be further coated with a thin, adherent, translucent layer of carbon to give a hitherto unknown family of colored nacreous flake pigments which derive their color, for the most part, from the optical phenomenon of interference. When the new flake pigments are dispersed in a conventional manner in various systems, the compositions so obtained exhibit intense color effects hitherto unobtainable, including a brilliant nacreous luster with a remarkable two-tone effect. When viewed at the specular angle under bright illumination, as in the sunlight, they exhibit a striking multi-colored or iridescent sparkle on the background of a predominant color which may vary from silver to gold and over the whole range of visible color, depending upon the thickness of the coating layers and upon the conditions of deposition.

Thus, the new colored nacreous flake pigments comprise three parts:

(1) A non-opaque flake substrate.
(2) A thin, adherent, translucent layer of titanium or zirconium oxide deposited thereon.
(3) A thin, adherent, translucent layer of carbon deposited on the metal oxide layer.

In a preferred embodiment of this invention, the non-opaque flake substrate is a flake-like micaceous mineral, usually muscovite mica, in a selected particle size range. Such flake substrates useful for the purposes of this invention are particles which have two dimensions (length and width) of similar magnitude and characteristically much greater than the third dimension. Specifically, the preferred flakes of this invention are at least about 5 to 10 microns in a major dimension and in the range of about 0.05 to 1.0 micron in thickness. For most pigment purposes, the upper limit in the major dimension is from 50 to 100 microns. However, for specialized uses such as in plastic articles of appreciable thickness, linoleum, and the like larger flakes up to as much as 1 mm. length may be used for special decorative effects. The lower limit in thickness of the mica flake is determined to a large extent by the physical strength of the flake and may be as little as 0.05 micron or even less, while an upper limit of about 3.0 microns, accompanied by a correspondingly greater length and width, is fixed by the effect on the coating composition surfaces. Such flakes must also be substantially planar with a relatively smooth and light reflecting surface and must be insoluble in either water or organic solvents and inert thereto.

A satisfactory grade of mica is a water ground white mica, frequently use as a reinforcing extender pigment in paint, all of which passes through a 200 mesh screen and about 90% through a 325 mesh screen. A mica pigment meeting ASTM specification D–607–42 is a preferred grade. However, for specialized purposes, it is quite possible to use flakes which are in the 140 mesh to 200 mesh range on the one hand as well as material which is considerably finer, approaching the 400 mesh size or even finer.

Another measure of particle size, more readily correlated in many ways with the application of the subsequent metal oxide film to the surface, is the specific surface area as measured by gas adsorption using the well-known B.E.T. method. This function has been found to vary appreciably from batch to batch of nominally similar sized micas. Mica with a surface area of about 3 square meters per gram and with a reasonably uniform particle size is a particularly suitable form. However, products of acceptable properties may be obtained from samples of mica with widely differing surface areas provided appropriate adjustments are made in the amount of metal oxide applied to form the transparent layers thereon so that the use of metal oxide per unit of surface area is appropriately controlled. No arbitrary limits on surface area can be established, but a range from about 2 sq. meters per gram to about 7 sq. meters per gram will encompass the products most likely to be desired.

In addition to the preferred muscovite mica, other forms of mica such as biotite, phlogopite, and related vermiculite, and various synthetic micas may be used as substrates in this invention. To obtain these products in the desired particle size ranges, it is preferred that they, also, be water ground. The introduction of agents to facilitate exfoliation or the introduction of other inert coatings which do not materially alter the refractive index of the mica nor its receptivity to the subsequently applied translucent layer of titanium oxide are contemplated as yielding mica flakes of equal value as substrates in this invention. The inherent color of some of these micas influences the color of the final products but the interference colors of the films deposited will still be present.

The preferred material for the thin translucent layer of metal oxide deposited upon the mica substrate is an oxide of tetravalent titanium, such as $TiO_2$, the particles of which are less than about 0.1 micron in diameter. Such a layer of $TiO_2$, as the hydrous oxide, is conveniently deposited upon a mica substrate by suspending the mica in a dilute strongly acidic solution of titanyl sulfate at ambient temperature and then hydrolyzing the titanium sulfate solution by rapidly heating to about 90–100° C. and maintaining at that temperature for about 2–3 hours so that the hydrous titanium dioxide as formed is continuously deposited on the mica with a minimum of formation of free hydrous titanium dioxide. Alternatively, the mica may be suspended in hot water to which is then rapidly added a strongly acidic concentrated titanyl sulfate solution after which hydrolysis and deposition of the hydrous titanium dioxide on the mica are brought about by continued heating at the boil until hydrolysis is complete. The choice between these methods is a matter of convenience.

Upon isolation of the products resulting from this step (usually by filtering, washing and drying), these products are nacreous powders exhibiting rather subtle interference colors which vary in hue with the thickness of the hydrous oxide film. Products obtained in this manner are interesting and valuable pigments in their own right especially after a calcination step to bring about a stabilization against the influence of light. Such pigments are the subject matter of a copending application.

An alternative procedure for depositing the film of titanium dioxide involves the exposure of hot ($\pm 600°$ C.) flakes of mica to the vapor of an organic titanate ester such as tetraisopropyl titanate in the absence of air or water vapor and preferably in a vacuum. Likewise, other water soluble salts of titanium may be used in the hydrolysis procedure. Thus, in particular, titanium oxychloride may be used on the one hand as can certain water soluble titanium esters such as titanium acetyl acetonate and triethanolamine titanate on the other hand.

Furthermore, a zirconium dioxide coating can be used in place of the titanium dioxide coating. It may be applied in a similar manner, and in similar amounts, by the hydrolysis of a solution of a suitable zirconium salt (zirconium oxychloride or zirconium sulfate, for instance) in the presence of mica. It is a peculiarity of hydrous zirconium oxide that it has a significantly lower refractive index than hydrous titanium oxide so that the products containing the simple layers of hydrous zirconium oxide are appreciably less nacreous in character than products containing the titanium oxide. However, the subsequent calcination in the deposition of the carbon layer converts it to the anhydrous $ZrO_2$ which is comparable to $TiO_2$ in refractive index. Products made in this way are comparable to those based on $TiO_2$.

The titanyl sulfate solution used in the preferred processes may be obtained in any convenient manner. Thus, a relatively pure titanyl sulfate may be obtained by dissolving in sulfuric acid a hydrous titanium oxide precipitate commonly obtained as an intermediate in the preparation of $TiO_2$ pigment. However, it has been found that such highly pure solutions are not necessary and that equivalent results can be obtained by using a conventional titanyl sulfate concentrate prepared from the ore and containing a small amount of iron which is maintained in the divalent state by the presence of a small amount of trivalent titanium in the strongly acid solution. Thus, the concentration of the titanyl sulfate in the aqueous solution may vary over a range, say preferably from about 2 parts (calculated as $TiO_2$) to about 20 parts per 100 parts of solution. Regardless of the concentration, it is necessary that there be free acid in the solution at all times over and above that necessary to convert all of the titanium oxide to $TiOSO_4$. This is necessary to prevent precipitation of a hydrous titanium oxide at room temperature. The titanium oxide art conventionally uses a "Factor of Acidity" (F.A.) as a parameter to define this relation where $$F.A. = \frac{100 \text{ (total acid—combined acid)}}{\text{Combined acid } (TiOSO_4)}$$

In the examples below, F.A. values of about 80 for a concentrated titanyl sulfate solution and about 220 for a more dilute titanyl sulfate are shown. Values in the range of about 50 to 300 are preferred for the best results. The critical condition is that there be sufficient acid to prevent hydrolysis at room temperature but not sufficient to repress hydrolysis excessively at elevated temperatures. The desired conditions will obviously vary somewhat with concentrations of reactants and with temperature and, within a broad range, the conditions may be readily determined by the skilled worker. In general, the preferred F.A. values are within the range considered optimum for the preparation of pigment-grade $TiO_2$.

Regardless of the source of the titanyl sulfate and regardless of the concentration in the starting material, the concentration of the titanium salt in the solution in which the mica is suspended at the point of hydrolysis is more dilute by a factor of at least 2 or 3 than is preferred for $TiO_2$ pigment. For the best results in this invention, this concentration of titanium salt (calculated as $TiO_2$) in the solution at the point of precipitation should be at least about 2 parts and should not exceed about 7 parts per 100 parts of solution.

The amount of the titanium (or zirconium) salt used in relation to the mica may vary over a wide range and is significant only as a control on the thickness of the ultimate oxide coating. In general, the usage, calculated as $TiO_2$ or $ZrO_2$ should be in the range of about 10 parts per 100 parts of mica up to as much as about 200 parts per 100 parts of mica with a preferred range for $TiO_2$ of about 15 to 80 parts per 100 parts of mica. This is, of course, reflected in the thickness of the layer deposited and the resulting color of the metal oxide flake upon which carbon is to be deposited. It has been found that when $TiO_2$ or $ZrO_2$ is deposited on mica in an amount 10–26% by the weight of the product, the metal oxide-coated mica exhibits a silver color. In the range of 26–40%, the pigment is golden in color; and in the range of 40–50%, the color of the pigment varies from red to blue to green as the thickness of the metal oxide layer is increased. In the range of 50–60%, higher order interference colors are obtained. Other means have also been used in this invention to correlate thickness of film with interference color. For example, a convenient measure of the thickness of the layer is the weight of $TiO_2$ deposited per unit area of mica surface (conveniently expressed as milligrams per square meter of mica surface) and this may vary from about 50 mg. of $TiO_2$ to 600 mg. of $TiO_2$ or more per square meter of surface. In the upper portion of this range, the observed colors are higher order interference colors. The relation between the weight of $TiO_2$ per square meter and the color varies somewhat between uncalcined and calcined products. However, within broad limits, the following table sets forth the correlation between the observed interference colors and the measured $TiO_2$ weight per square meter of mica surface. Since color hues vary continuously over the spectrum, it is obvious that the ranges merge at the dividing points.

| Color: | Mg. $TiO_2$ per square meter |
|---|---|
| Silver | 50 to 100 |
| Gold | 100 to 180 |
| Red | 180 to 220 |
| Violet | 220 to 240 |
| Blue | 240 to 260 |
| Green | 260 to 280 |
| 2nd order gold | 280 to 350 |

The weight of $ZrO_2$ per square meter will be somewhat larger than these figures because of the higher density. The general principles, however, apply.

The isolation of $TiO_2$- or $ZrO_2$-coated pigments by filtering, washing, and drying is entirely conventional; however, it is well known that a certain amount of sulfate ion is very tenaciously held by a hydrous titanium dioxide precipitate, and it is sometimes desirable to favor the more complete removal of this sulfate by washing with a dilute alkaline solution such as dilute ammonium hydroxide either on the funnel or by reslurrying in such a solution, followed by filtering and washing again.

It appears that one of the critical features distinguishing the new products from the titanium dioxide pigments of the prior art lies in the character of the titanium oxide deposited on the mica flakes. Examination of such flakes, both before and after calcination, in the electron microscope, suggests that the hydrous oxide film has particles so small as to be very poorly resolved in the electron microscope. They are not completely noncrystalline because they have a distinguishable X-ray diffraction pattern and there is some evidence of very small particles, in the order of 0.01 micron in size, but these particles do not appear to have sharp edges and tend to be irregular in size and shape. During calcination in the presence of a hydrocarbon to deposit the layer of carbon as described in detail below, a definite crystalline pattern of the $TiO_2$ becomes evident, but it appears that the deposition of the carbon inhibits growth of the $TiO_2$ crystallites and they remain extremely small and densely packed so that the optical character is that of a film. Accurate measurement of the particles in such a film is difficult, but the maximum particle size at any calcination temperature below about 1000° C. is well under 0.1 micron. It is, of course, possible and may be preferred under some circumstances to calcine the $TiO_2$-coated flakes before the deposition of any carbon layer. In such a case, the inhibiting effect on particle size growth from the carbon being simultaneously deposited is not present but, even in this case, at temperatures below 1000° C., including the preferred range of 700–1000° C., the maximum size of the $TiO_2$ crystallites is about 0.1 micron and the optical continuity of the layer is retained. The carbon layer may be applied to a previously calcined $TiO_2$ layer or it may be deposited simultaneously with the calcination of the $TiO_2$ layer. The resulting products are highly colored nacreous flake pigments with a brilliant iridescent sparkle under bright illumination. A convenient and preferred procedure to bring about the deposition of the carbon layer is to wet the dried flakes, previously coated with $TiO_2$, with a relatively high-boiling liquid hydrocarbon, such as mineral spirits and to subject this mixture to pyrolysis in an inert atmosphere at a temperature in the range of 700–1000° C.

The choice of $TiO_2$-coated mica flakes on which the carbon is to be deposited is critical to this invention only as it influences the observed color of the final product. It is pointed out above that the thickness of $TiO_2$ layer can be correlated with a resulting interference color and that the color will change somewhat as calcination reduces the thickness of the layer. Since the deposition of a carbon layer always involves the equivalent of a calcination step, the application of carbon to an uncalcined product results in some change in hue corresponding to the calcination effect. Aside from this, however, within the range of amount of carbon preferred in this invention, the effect of carbon deposition is one of a profound intensification of the color rather than any major change in the observed hue. Also, as a general rule, the most intense colors result when the deposition of carbon and the calcination of the $TiO_2$ are effected simultaneously with some probable intermingling of the layers. On the other hand, very intense light gray nacreous pigments are obtained when carbon is deposited on previously calcined silver-colored $TiO_2$-coated flakes.

The choice of hydrocarbon from which the carbon layer is deposited is not at all critical, nor is it necessary that the hydrocarbon be liquid. Such diverse materials as mineral spirits, a purified mineral oil, aromatic hydrocarbon liquids such as benzene or xylene, and various hydrocarbon gases such as propane, ethylene, and even natural gas may be used with suitable modifications of the process. When a liquid is used, it is preferred to wet the flakes with sufficient liquid to make a stiff paste which is then introduced into the pyrolysis zone. However, when a gas is used, a convenient way of insuring contact between the gas and the hot mica is to support the mica in a porous vessel, such as a basket of fine wire screen, which will permit the gas to penetrate throughout the mass.

It is also possible to use other organic materials as the source of the carbon. Thus, higher fatty acids such as oleic acid, stearic acid, and the like may be used as well as derivatives of these fatty acids such as their esters, including the natural fats and oil, and even their salts, including commercial soaps. However, it should be pointed out that compounds containing oxygen in the molecule, on pyrolysis, tend to form soot or particulate carbon which is an undesirable impurity. For this reason, any oxygen in the molecule of the carbon source should be, at most, a minor part thereof.

In like manner, oxygen in the atmosphere of the pyrolysis zone is to be avoided. In sufficient amount, it is hazardous in the creation of a possibly explosive atmosphere. In lesser amounts, it can cause the deposition of undesirable soot or particulate carbon. Oxygen can be readily excluded from the pyrolysis zone by the use of an inert atmosphere such as nitrogen or argon. This may conveniently be done by evacuating the equipment and releasing the vacuum with the inert gas or by prolonged flushing with a stream of the gas.

The amount of hydrocarbon, or other agent, used is one of the variables influencing the amount of carbon applied. When the carbon source is a liquid, it is usually preferred to add an amount that will make a stiff paste. This will be in the order of equal parts by weight of hydrocarbon and mica flakes up to about twice as much hydrocarbon as mica. In general, larger amounts of hydrocarbon result in the deposition of more carbon but it will be obvious that the temperature and time of pyrolysis will also influence the thickness of the carbon layer.

The temperature of pyrolysis and the time of exposure at any given temperature are thus interrelated and important variables. The temperature may vary over a considerable range from about 700° C. up to about 1000° C. Temperatures significantly below 700° C. usually give poor deposits of carbon which tend to cause dullness and brownness in the overall color of the product. Moreover, at temperatures in the lower end of the useful range, the rate of deposition of carbon is slow so that the resulting layer is thinner than at higher temperatures unless the heating is prolonged for an excessive period of time. However, particularly when the $TiO_2$-coated mica flakes have been previously calcined, very desirable products are obtained in the range of 700° C.–850° C. If, on the other hand, the carbon is being deposited on uncalcined $TiO_2$ treated mica flake, higher temperatures, in the range of 900–950° C., are necessary to obtain acceptable lightfastness. Temperatures above about 1000° C. offer no special advantages and may have the disadvantage of promoting the growth of the $TiO_2$ crystallites to a size that no longer shows the desired optical properties of a thin film.

The amount of carbon deposited at any given temperature is more or less directly related to the time of exposure. Thus, short exposures at 900–950° C. give products having smaller amounts of carbon, whereas longer heating periods increase the carbon content. It is also possible to use lower temperatures, say 800–850° C., for a longer time to obtain any desired carbon content.

The amount of carbon which is deposited on the coated mica flakes to give nacreous colored flake pigments may vary over a wide range, say from about 0.3% to about 25%, based on total pigment weight. A preferred range is about 1 to 15% with an even more preferred range of about 1 to 10% based on total pigment weight. In many instances, the carbon will not only be deposited on the metal oxide layer, but it will also be intermingled in the layer.

The preferred amount of $TiO_2$ or $ZrO_2$ with the above-stated amounts of carbon is 10–45%, based on total pigment weight.

The following compositions are representative of products coming within the preferred range for $TiO_2$ and carbon, as specified above:

|  | Weight, parts | Percent Composition | Weight, parts | Percent Composition |
|---|---|---|---|---|
| Mica | 100 | 84 | 100 | 55 |
| $TiO_2$ | 15 | 15 | 80 | 44 |
| Carbon | 1.2 | 1 | 2 | 1 |
| Mica | 100 | 78 | 100 | 50 |
| $TiO_2$ | 15 | 12 | 80 | 40 |
| Carbon | 13 | 10 | 20 | 10 |
| Mica | 100 | 74 | 100 | 47 |
| $TiO_2$ | 15 | 11 | 80 | 38 |
| Carbon | 20 | 15 | 32 | 15 |

Whereas the amount of $TiO_2$ on the flakes influences the hue of the observed color, the effect of the amount of carbon on top of this coating is largely to intensify and to deepen the color. Relatively small amounts of carbon tend to give lighter and more intense colors and are generally preferred, but larger amounts of carbon may be used to give deeper shades of color which are very valuable in some uses.

Although the metal oxide layer ($TiO_2$ or $ZrO_2$) is shown by examination in the electron microscope to be clearly particulate in nature, similar studies of the combined films ($TiO_2$ and carbon) have shown no evidence of the presence of additional particulate material. This leads to the conclusion that the carbon film is essentially continuous in nature, probably filling in the minute spaces between the $TiO_2$ particles and generally smoothing out the physical surface of the film thus enhancing the color properties. The continuous nature of the film is further supported by the formation of carbon films deposited directly on mica. When such films are isolated by dissolving the mica in hydrofluoric acid and then examined under the electron microscope, no obvious discontinuities have been seen.

The new nacreous colored flake pigments of this invention have a combination of properties of special value in coating compositions not heretofore obtainable in any single product nor in any combination of products. In the formulation of coating compositions, it is common practice to add aluminum powder or flake pigments to compositions containing colored pigments, the resulting finish being referred to as "metallized" and being very desirable for many uses. Such metallized finishes have a pronounced metallic luster but exhibit little, if any, sparkle or iridescence. With all their good properties, they have certain well-recognized defects, perhaps the most serious being known as water-spotting. It has been an unsolved problem to obtain a metallized finish which is not susceptible to water-spotting. The new pigments of this invention may be used in coating compositions to obtain effects which are not unlike the metallizing effect of aluminum combined with conventional colored pigments as to color, but which are generally softer in effect. Such compositions have a pronounced sparkle with a flash of iridescent colors and are completely resistant to water-spotting throughout the color range. Moreover, whereas the addition of significant amounts of aluminum powder to a coating composition containing conventional pigments tends to degrade the lightfastness, the new pigments appear to be completely lightfast, either when used alone or in combination with other pigments.

It is, of course, possible to use these pigments in combination with other more conventional pigments to obtain the "metallizing" effect of the new pigments combined with any desired range of colors which may be obtained by mixing of the pigments.

An outstanding property of the new flake pigments is their remarkable ease of dispersion in coating composition vehicles. It has been considered necessary with substantially all pigments known to the art to subject them to considerable grinding action for the necessary degree of dispersion required in formulating high quality paints, enamels, and the like. $TiO_2$ requires substantial grinding to give acceptable enamels. Mica also requires considerable work on the system for good dispersion. It is, therefore, totally unexpected to find that the new pigments, whether calcined or not, can be dispersed in a great variety of vehicles by simple vigorous agitation. Additional grinding shows little, if any, advantage and can be easily carried to the point where the flakes are broken with an undesirable effect on the color obtained.

Whereas, mica flakes coated with $TiO_2$ alone, used as intermediates in this invention, exhibit rather subtle interference colors not readily apparent in the bulk powders, the flake pigments of this invention, containing both $TiO_2$ and carbon, are brilliantly colored sparkling powders. Such pigments are especially useful as ingredients of compositions such as paints, printing inks, plastic films, rubber articles, and the like to which they impart color and other decorative effects and often exert a profound influence on the durability of such compositions on exposure to the elements. When the color and decorative properties of pigments are mentioned, it is generally understood that reference is being made to compositions containing the pigments of which the following are typical but not limiting.

FORMULATION A

Unsupported Film of Cellulose Acetate 1.0 part of pigment is added to 20 parts of a cellulose acetate solution containing 16.7% cellulose acetate in acetone. The mixture is stirred until thoroughly mixed. A glass plate is prepared for stripping a film therefrom by coating the clean plate with a silicone stopcock grease and then wiping thoroughly with a dry cloth. The lacquer is spread on the glass plate and drawn down to a wet film thickness of about 0.16 mm. After the solvent has evaporated, the film is stripped from the plate and observed on the smooth side. Such films are conveniently used for lightfastness tests in a "Fade-Ometer."

FORMULATION B

Baked Acrylic Lacquer 2.5 parts pigment
17.9 parts mixed acrylic ester polymer ("Acryloid" A–101—Rohm and Haas)
7.7 parts butyl benzyl phthalate
20.0 parts monoacetate of ethylene glycol monoethyl ether
56.9 parts methyl ethyl ketone
50.0 parts toluene The pigment is dispersed by vigorous stirring with the resin and plasticizer together with a portion of the solvents for about 15 minutes; the remainder of the solvents is then added and the mixing continued until uniform. Exhibits are prepared by spraying onto primed panels and, after drying, baking at 80–85° C. for 20 minutes. Alternatively, as a quick testing method, films of this lacquer may be spread to uniform thickness with a "doctor blade" and observed after air drying.

FORMULATION C

Baked Alkyd Enamel 2.5 parts pigment
29.2 parts non-oxidizing coconut oil-modified alkyd resin solution (60% solids)
13.6 parts modified melamine formaldehyde resin (55% solids)
15.0 parts aromatic hydrocarbon solvent
19.0 parts aliphatic hydrocarbon solvent The pigment is added to the mixed resin solutions with a part of the solvent and dispersed by high-speed stirring for about 15 minutes after which the remainder of the solvent is stirred in. The resulting enamel is sprayed onto a primed metal panel and baked one-half hour at about 120° C. Films of uniform thickness may also be applied with a "doctor blade."

FORMULATION D

Vinyl Plastic Film 3 parts pigment
100 parts vinyl chloride polymer
40 parts dioctyl phthalate
10 parts polyester resin
3 parts stabilizer (barium-cadmium-zinc phosphite)
0.25 part stearic acid The pigment is added to the mixture of ingredients and the whole mixture is processed on a two-roll mill, heated to 155° C., until uniform. It is finally taken from the mill as a sheet of any desired thickness which may be observed as obtained or may be press polished in a suitable heated press.

These compositions are all conventional and may be modified in well-known ways or may be replaced by equally conventional compositions including cellulose nitrate lacquers, linseed or other oleoresinous varnishes, linoleum compositions, rubber, polyethylene resins and the like.

In all cases, the observed color can be confirmed by optical measurements such as spectrophotometric reflectance curves which can be determined by measurements on dispersions of the colors over non-reflecting backgrounds.

The following examples illustrate but do not limit this invention. The term "parts" refers throughout to parts by weight unless specifically designated otherwise.

EXAMPLE I

*Preparation of Silver Pearl TiO$_2$-Coated Mica Flakes*

59.4 parts of water ground white mica is dispersed in 394 parts of water. The mica is muscovite mica sold under the trade name "Concord Wet Ground Mica #200/325." It has a specific surface of about 3.3 square meters per gram, as determined by krypton adsorption in the previously mentioned B.E.T. method, it all passes through a 200 mesh screen and about 94% through a 325 mesh screen. The average particle size is in the range of about 20–40 microns in maximum dimension and about 0.1 micron in thickness. The well stirred slurry is heated to about 95° C. and 146 parts of a strongly acidic concentrated titanyl sulfate solution is added rapidly. This solution contains 15.2% TiO$_2$ (equivalent to 22.2 parts TiO$_2$); it has an F.A. of about 80 and contains a small amount (3–4%) of ferrous sulfate as an impurity which takes no part in the subsequent hydrolysis. The charge is then brought to the boil with external heating and held at the boil under reflux for 45 minutes. It is then cooled to 50° C. filtered, washed substantially free of sulfate ion, and dried at 60° C., to give 75 lbs. of a slightly yellow powder with obvious flake-like characteristics. By analysis, the product contains 20.7% hydrous TiO$_2$ which corresponds almost exactly to the theoretical content based upon yield, indicating somewhat less than total usage of the available titanium compound. When this product is dispersed in a coating composition vehicle and coated over a dark background, it exhibits a brilliant silver color with a multi-colored iridescence in bright illumination.

EXAMPLE II

*Silver Colored Flakes*

The product of Example I is calcined 1 hour at 950° C. by heating it in a thin bed in a suitable furnace. The calcined product is cooled to room temperature and is then mixed with mineral spirits (a petroleum hydrocarbon fraction having a boiling range of approximately 150–210° C.) in the proportion of one part calcined product to 1.8 parts of mineral spirits. The resulting paste is spread on a stainless steel tray in a bed approximately ¾" deep, 2" wide, 18" long. The tray with the paste is then inserted in a silica tube approximately 3" in diameter and 36" long, the ends of which are fitted with closures that enable the atmosphere in the tube to be evacuated on the one hand, or a gas such as nitrogen to be passed through the tube on the other hand. It is preferred that the exit tube be fitted with a water trap to prevent any access to the atmosphere. The silica tube is then evacuated to a constant pressure represented by the vapor pressure of the mineral spirits, after which the vacuum is released by the introduction of nitrogen gas. This evacuation and release of the vacuum with nitrogen is repeated to a total of three times, and the tube is then placed in a furnace of sufficient dimensions to completely enclose the portion containing the stainless steel tray. A nitrogen flow of approximately .02 cubic foot per minute is then introduced through the tube and the tube and its contents are heated to 700° C. over a period of about 40 minutes and maintained at 700° C. for 30 minutes, after which the tube and contents are cooled to room temperature in a constant atmosphere of nitrogen and the flake product is then removed from the tray. This product contains 1.2% carbon by weight and comprises silver-gray flakes which exhibit a brilliant iridescent sparkle when incorporated in a paint vehicle and viewed in a bright light.

By varying the temperature of heating in the range of 500–950° C., in all other respects following the procedure of this example, the color varies from a very light gray (silver) to a blue shade gray with increase in carbon content as shown in the following table:

| Temp., ° C. | Percent carbon | Color |
| --- | --- | --- |
| 500 | 0.4 | Very light gray. |
| 600 | 0.8 | Light gray. |
| 700 | 1.2 | Gray. |
| 800 | 2.0 | Do. |
| 900 | 2.7 | Do. |
| 950 | 3.8 | Blue-gray. |

EXAMPLE III

*Use of Uncalcined TiO$_2$-Coated Flakes*

The uncalcined silver pearl flakes prepared according to Example I are mixed with mineral spirits in the proportion of one part of the flake pigment to 1.8 parts of mineral spirits. The resulting paste is spread on a stainless steel tray and inserted in a furnace as shown in more detail in Example II, and the tube is then evacuated and the atmosphere replaced with nitrogen as also shown in Example II. The tube is then placed in the furnace and provided with a nitrogen flow of approximately 0.02 cubic foot per minute through the tube and the tube and its contents are heated to 950° C. over a period of approximately 40 minutes and maintained at 950° C. for 30 minutes, after which the tube and contents are cooled to room temperature and the flake product removed. This product is a greenish golden flake pigment, which exhibits a pronounced iridescent sparkle on a background of a greenish golden color when dispersed in a paint film and applied to a surface in the customary manner. The carbon content was 5.3%.

EXAMPLE IV

*Golden Flakes by Carbon Coating of Uncalcined Golden TiO₂-Coated Mica Flakes*

A golden colored $TiO_2$-coated mica flake pigment is prepared by the general method of Example I modified by the use of 214 parts of the titanyl sulfate solution (equivalent to about 31 parts of $TiO_2$) and by heating the product at the boil for three hours instead of for 45 minutes. The product, which contains about 32.6% hydrous $TiO_2$, is a golden colored flake with a marked iridescence and nacreous character when dispersed in a coating composition vehicle. This product is mixed with mineral spirits in the proportion of 1 part of the coated flake to 1.2 parts of mineral spirits and the resulting paste is spread in a bed approximately ¼" deep by ⅜" by 2" in an open silica boat which is placed in a silica tube of a nature similar to that described in Example II and the atmosphere in the tube is replaced with nitrogen by repeated evacuation and release of the vacuum with nitrogen. A very slow nitrogen flow (about .02 cubic foot a minute) is introduced into the tube and the tube is then introduced slowly into a furnace previously heated to 900° C. The tube and the contents are heated very rapidly (about 3 minutes) to 900° C. and are held at 900° C. for 30 minutes. The tube and contents are then cooled to room temperature while maintaining the nitrogen flow, and the resulting flakes are removed from the tube and a portion of the flakes incorporated into an acrylic lacquer, such as described in Formulation B, and the laquer coated on a panel to give a brilliant light golden finish with an iridescent sparkle under bright illumination. The flake pigment contains 2.0% carbon.

If the temperature of pyrolysis is increased from 900° C. to 950° C., other conditions remaining the same, the resulting product is darker and somewhat duller. If the time during which the product is held at 950° C. is increased substantially beyond the 30 minutes specified above, the resulting product is a dark golden green in color with somewhat reduced intensity but with a substantial iridescent sparkle.

EXAMPLE V

*Carbon Coating of Calcined Gold TiO₂-Coated Mica Flakes*

The golden colored $TiO_2$-coated mica flakes (containing about 32.6% hydrous $TiO_2$) prepared in the first part of Example IV is calcined prior to treatment with carbon by heating in air at 950° C. for 30 minutes and then allowing to cool. The resulting golden colored flake is mixed with mineral spirits in the proportion of 1 part of flake to 1.2 parts of mineral spirits to form a thick paste which is charged to a silica boat which is then calcined at 950° C. in an atmosphere of nitrogen by introducing a tube containing the boat into a furnace previously heated to 950° C. and maintaining the temperature at 950° C. for 30 minutes. After cooling, the product which is removed from the boat is a golden colored flake pigment somewhat less intense than the product of Example IV in which the calcination of the $TiO_2$ and pyrolysis of the mineral spirits are carried out simultaneously.

EXAMPLE VI

*Brown Flakes by Carbon Coating of Uncalcined Golden TiO₂-Coated Flakes*

A gold colored mica flake is prepared by adding 1000 parts of water ground mica (Concord Wet Ground Mica 200/325) to 9200 parts of a diluted titanyl sulfate solution (4.45% $TiO_2$ equivalent—F.A. 217), to which had been added 230 parts of the same solution which had previously been heated to develop a small amount of "seed," followed by heating the slurry at the boil for about 2 hours. The resulting gold colored flake is isolated in a conventional manner to give about 1540 parts. From a portion of this, a paste is formed by mixing these flakes with mineral spirits in the proportion of 1 part flake to 1.2 parts mineral spirits and the resulting paste is placed in a tray which is in turn placed in a silica tube within which the atmosphere has been replaced with nitrogen in the manner more fully set forth in Example IV. With a flow of nitrogen at the usual rate, the center portion of the tube containing the tray is heated over a period of about 40 minutes to 850° C. and maintained at 850° C. for 30 minutes, after which it is allowed to cool to room temperature in the nitrogen atmosphere. The product resulting from this procedure is a brown colored flake pigment, which contains 9.2% carbon. When this product is dispersed in an alkyd coating composition such as described in Formulation C, a dry film of enamel prepared therefrom exhibits an attractive brown color with a pronounced sparkle.

If the pyrolysis with mineral spirits is carried out at a higher temperature, say about 950° C. instead of 850° C., the resulting flake pigment, although still brownish in general color, exhibits a purplish hue along with the iridescent sparkle. If the $TiO_2$/mica flakes are calcined at 950° C. before the pyrolysis with mineral spirits, the color of the resulting carbon-coated flakes is less intense than when the calcination of the $TiO_2$-coated mica flake is carried out simultaneously with the pyrolysis of the hydrocarbon.

EXAMPLE VII

*Purple Colored Carbon-Coated Flakes by Carbon Coating a Violet Colored TiO₂-Coated Mica Flake*

In preparing a violet colored $TiO_2$-coated mica flake, it is convenient to use 9200 parts of a diluted titanyl sulfate solution (4.45% $TiO_2$ equivalent—F.A. 217) to which has been added 230 parts of a portion of the same solution which has been previously heated to develop a small amount of "seed." 900 parts of water-ground mica (Concord Wet Ground Mica 200/325) is then added to the titanyl sulfate solution and the mixture is heated under good agitation to the boil and maintained at the boil for about 2 hours until a diluted portion of the slurry over a dark background under good illumination shows the flakes to be reddish to violet in color. The product is isolated by filtering and washing substantially free of sulfate ion and subsequently dried at 60° C. to give violet colored dry flake pigment containing about 37.1% hydrous $TiO_2$. A portion of this violet colored flake is mixed with mineral spirits in the proportion of 1.2 parts of mineral spirits per part of flake and this paste is placed in a suitable tray in a tube arranged for evacuation of the atmosphere and for nitrogen flow through the tube as more particularly described above. This tube is mounted in a suitable furnace at room temperature, the nitrogen atmosphere introduced and a slow flow of nitrogen gas is started through the tube. The tube and contents are then heated to 950° C. over a 40 minute period and maintained at 950° C. for one-half hour. The tube is cooled to room temperature with continued nitrogen flow and the product then removed. It consists of an attractive iridescent purple flake with a carbon content of 6.6%.

If the temperature of heating is increased to 980° C., a blue colored flake with a carbon content of 7.1% is obtained.

EXAMPLE VIII

*Green Colored Flakes*

A golden colored $TiO_2$-coated mica flake pigment is prepared by the method shown in the first part of Example VII modified by using 1000 parts of mica flake instead of 900 to give a gold colored flake containing about 35.3% hydrous TiO$_2$. This product is mixed with mineral spirits in the proportion of 1.2 parts of mineral spirits to one part of TiO$_2$-coated flake and the resulting paste is spread in a bed approximately ½" thick on a stainless steel tray 2" wide and 6' long. This tray is inserted in a 9' long x 3" diameter stainless steel tube which is fitted with closures to provide for evacuation of the atmosphere, replacement with nitrogen gas, and ultimately with a flow of nitrogen gas through the tube during the remainder of the operation. An electric tube furnace of a suitable diameter with a 15" long heating zone is positioned at one end of the tube and placed on rollers to permit movement of the furnace along the tube. The atmosphere in the tube is then replaced with nitrogen and a slow nitrogen flow through the tube is established and the temperature of the furnace is then raised to 900° C. After equilibrium temperature is established, the furnace is moved along the tube at the rate of 1" every 2.5 minutes, so that approximately 37 minutes is required for passage of the heating zone past a given point. Upon completion of the passage of the furnace from one end of the tube to the other, the tube and contents are allowed to cool with continuation of the nitrogen flow and, ultimately, the cooled product is removed from the tube and found to be a sparkling olive shade green product containing 10.3% carbon.

EXAMPLE IX

Variation in Source of Carbon

The previous examples have all used mineral spirits, a petroleum hydrocarbon with a boiling range of about 115–210° C., as the source of the carbon which is deposited by pyrolysis. Using the general process for depositing carbon shown in Example IV (1.2 parts of agent per part of mica with a pyrolysis temperature of 950° C.), the following table summarizes the results with various sources of carbon.

| Carbon source | Percent carbon | Color |
| --- | --- | --- |
| Mineral spirits | 2.7 | Gold. |
| Mineral oil | 2.7 | Do. |
| 10% soap solution in water-dried | 3.7 | Purple. |
| Mineral spirits—double the amount (2.4 parts). | 13.8 | Do. |
| Xylene | 3.4 | Golden brown. |
| Ethylene (3 min. at 900° C.) | 2.7 | Gray. |

EXAMPLE X

Use of Hydrocarbon Vapors as Source of Carbon

A portion of the TiO$_2$-coated mica flakes prepared in the first part of Example VII is calcined in air for one hour at 950° C. It is then placed on a 16 mesh stainless screen in a bed approximately ¼" deep x 2" long and the screen with the dry flakes on it is inserted in a 1" diameter silica tube in a tube furnace of suitable diameter, the tube being equipped for replacement of the atmosphere with nitrogen gas and a slow flow of nitrogen through the tube. The tube and furnace are also slightly inclined toward the gas discharge end, about 1" inclination per foot. The furnace and its contents are then heated to 700° C., during theh heatlup cycle, a total of about 18 grams of mineral spirits is added drop-wise to the higher end of the tube so that it can run down into the heating zone. When the temperature reaches 700° C., the addition of mineral spirits is stopped and the temperature is maintained with a constant slow flow of nitrogen for about 30 minutes at 700° C., after which the charge is cooled and removed from the furnace to give a blue colored mica flake containing 1.7% carbon.

Propane gas or a mixture of equal parts propane gas and nitrogen can be used instead of the mineral spirits vapor to give a carbon coated colored mica flake usually somewhat less intense in color than the product resulting from the use of mineral spirits.

EXAMPLE XI

Double Layer of TiO$_2$ Under the Carbon

It has been pointed out in the examples above that the application of a carbon coating to a previously calcined titanium dioxide coating usually results in a less intense color than may be obtained by simultaneous calcination and deposition of the carbon. However, it has also been pointed out that a calcination step applied to the TiO$_2$-coated mica pigment is necessary for optimum lightfastness. It is immediately apparent that there is a tendency for conflict in the results of these two steps; the calcination prior to deposition of carbon appears to give the best lightfastness, but the deposition of the carbon along with calcination gives the better color in general. It has also been noted in various aspects of this development that pyrolysis temperatures in the order of 700–750° C., frequently give better color, notably with the silver grays, than the higher temperatures which seem to be necessary for the best lightfastness. It is now found that this conflict in results can be overcome, without sacrifice of advantages in color, by first applying a coating of TiO$_2$ to the mica and calcining it at an optimum temperature and then applying a thin layer of uncalcined hydrous TiO$_2$ to this previously calcined product, followed by the application of the carbon coating by pyrolysis at any preferred temperature.

As an example of such a process, a TiO$_2$-coated mica flake is prepared by adding 1500 parts of mica flakes with a surface area of about 3.0 square meters per gram to 11,500 parts of an aqueous titanyl sulfate solution containing the equivalent of 4.1% TiO$_2$. This slurry is heated with good agitation to boiling temperature by external heating and is boiled for approximately 3 hours until a dilute sample of the slurry, viewed in a strong light against a dark background, appears red by reflected light. The slurry is then filtered, washed with water until substantially sulfate free and calcined in air at 950° C. for one hour to give a golden colored flake pigment.

100 parts of the cooled flake pigment is then dispersed in 585 parts of the same titanyl sulfate solution (4.1% TiO$_2$) and the resulting slurry is heated to the boil with stirring and boiled until the color by the same test changes from the original gold to a brilliant blue. The slurry is then filtered, washed with hot water to substantial freedom from soluble salts, and dried in an oven at 60° C. The dried flake product is then mixed with mineral spirits in the proportion of 1.0 part of flake to 1.2 parts of mineral spirits and the resulting paste treated with carbon by pyrolysis in a silica tube as described in Example II with heating to 700° C. over a period of 40 minutes and maintaining at 700° C. for 15 minutes. After cooling, the resulting carbon coated flake pigment has a brilliant blue color at least equal to that which could be obtained by start with an uncalcined TiO$_2$-coated mica, but exhibiting a marked advantage in lightfastness over such a product.

EXAMPLES XII AND XIII

The following examples illustrate the use of mixtures of the new colored flake pigments with conventional colored pigments to obtain highly attractive decorative effects.

*Example XII.—Acrylic lacquers with mixtures of pigments.*—These lacquers are based upon a vehicle blend consisting of:

85.4% mixed acrylic ester polymer (Acryloid A–101)
14.6% butyl benzyl phthalate (as plasticizer)

and a solvent blend consisting of:

20% monoacetate of ethylene glycol monoethyl ether

30% methyl ethyl ketone
50% toluene

A copper phthalocyanine (CPC) blue arcylic lacquer (made in a conventional manner in a ball mill) consists of:

3.2 parts copper phthalocyanine blue
66.2 parts vehicle blend
30.6 parts solvent blend

|  | A | B |
|---|---|---|
| Silver Flake Pigment (Example II), parts | 4.75 | 4.75 |
| Vehicle Blend, parts | 97.0 | 97.0 |
| CPC Blue Lacquer, parts | 7.8 | 1.6 |
| Solvent Blend, parts | 21.7 | 21.7 |

The ingredients are thoroughly blended by high speed agitation for 15 minutes, thinned with additional solvent blend to spraying consistency and sprayed with 3 double coats on a suitable panel.

In lacquer A, the silver flake/blue ratio is 95/5 and the resulting panel exhibits a highly pleasing "metallized" effect with a more pronounced sparkle than usually exhibited by lacquers containing aluminum flake. The effect is obtained over a fairly wide range of flake/color ratios up to as much as about 50/50.

In lacquer B, the silver flake/blue ratio is 99/1 and the resulting panel exhibits the effect of a bluish toned pearl with a brilliant iridescent sparkle under bright illumination.

*Example XIII.—Alkyd enamel with a mixture of pigments.*—A polychloro copper phthalocyanine green (CPC green) enamel of the following composition is prepared by dispersion in a ball mill in the conventional manner:

5.0 parts CPC green pigment
42.6 parts non-oxidizing coconut oil-modified alkyd resin solution (60% solids)
20.0 parts modified melamine formaldehyde resin (55% solids)
16.2 parts aromatic hydrocarbon solvent
16.2 parts aliphatic hydrocarbon solvent A portion of this enamel is mixed with a nacreous flake pigment as follows:

| | Parts |
|---|---|
| Gold flake pigment (Example IV) | 4.75 |
| CPC green enamel | 5.00 |
| Non-oxidizing coconut oil-modified alkyd resin solution (60% solids) | 58.4 |

These ingredients are mixed for 5 minutes by high speed agitation after which 27.2 parts of modified melamine formaldehyde resin (55% solids) is added and high speed agitation is continued for 5 minutes. The enamel is then reduced to spraying consistency with a 50/50 aromatic/aliphatic hydrocarbon mix and sprayed with 3 double coats onto a suitable panel. This enamel contains a gold flake/CPC green ratio of 95/5 and the color is much yellower than that of the CPC green enamel alone. In addition, the panels exhibit a lustrous golden sparkle.

The pigments described in the foregoing specification offer the following notable advantages:
(1) They can be prepared and marketed as dry pigments.
(2) These dry pigments show a remarkable ease of dispersion in the compositions in which they are used.
(3) They show a nacreous effect of a degree not readily produced with prior art nacreous pigments.
(4) They show an iridescent sparkle with a pronounced predominant hue which may be varied at will by simple alterations in the compositions.
(5) When properly stabilized, they offer a high degree of lightfastness.
(6) They exhibit substantial freedom from toxicity.
(7) They are chemically stable and do not contribute to water-spotting of surfaces finished with compositions containing them.
(8) They are heat stable and can be used in the baking enamels and in plastics processed at high temperature.
(9) They are completely non-bleeding in solvents and in the usual chemical agents to which coating compositions may be subjected.
(10) They are universally compatible with coating composition vehicles and plastic systems commonly met.
(11) They make possible tinctorial effects not heretofore obtainable.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. A pigment composition consisting essentially of translucent micaceous flakes having on the surface thereof a translucent layer of metal oxide consisting essentially of an oxide selected from the group of titanium dioxide particles and zirconium dioxide particles, said metal oxide layer having superimposed thereon a translucent layer of carbon, said carbon layer constituting 1 to 15% by weight of the pigment, the metal oxide layer constituting 10 to 45% by weight of the pigment.

2. The composition of claim 1 in which the micaceous flakes are white mica flakes and the metal oxide is titanium dioxide.

3. The composition of claim 2 in which the white mica flakes have a surface area of 2–7 square meters per gram.

4. A pigment composition consisting essentially of translucent micaceous flakes having on the surface thereof a translucent layer of metal oxide consisting essentially of particles selected from the group of titanium dioxide particles and zirconium dioxide particles substantially all of which are less than 0.1 micron in particle size, said metal oxide layer having superimposed thereon a translucent layer of carbon, said carbon layer constituting 1 to 15% by weight of the pigment, the metal oxide layer constituting 10 to 45% by weight of the pigment.

5. The composition of claim 4 in which the carbon layer constitutes 1 to 10% by weight of the pigment and the metal oxide layer constitutes 10 to 45% by weight of the pigment.

6. The composition of claim 4 wherein the metal oxide is titanium dioxide.

7. A pigment composition consisting essentially of a translucent micaceous flake substrate having on the surface thereof a translucent layer of a colorless metal oxide selected from the group of titanium dioxide and zirconium dioxide and superimposed thereupon, a translucent layer of carbon, said compositions being colored nacreous flake pigments varying in hue from silver through gold to red, blue to green and exhibiting, under bright illumination, a lustrous sparkle.

8. A process for the production of a pigment comprising depositing 1–15% by weight, based on the final pigment, of a translucent layer of carbon upon micaceous flakes having on the surface thereof a translucent layer of metal oxide consisting essentially of particles from the group consisting of hydrous titanium dioxide particles, titanium dioxide particles, hydrous zirconium dioxide particles, and zirconium dioxide particles, substantially all of which are less than 0.1 micron in particle size, said metal oxide layer constituting 10–45% by weight of the final pigment, said deposition being effected by pyrolyzing a hydrocarbon at a temperature of 700–1000° C. in the absence of air and in the presence of said micaceous flakes.

9. The process of claim 8 wherein the micaceous flakes have a layer of hydrous titanium dioxide on the surface thereof.

References Cited in the file of this patent

UNITED STATES PATENTS

| | | |
|---|---|---|
| 834,739 | Lillienfield | Oct. 30, 1906 |
| 2,332,220 | Harshberger | Oct. 19, 1943 |
| 2,875,076 | Suchow | Feb. 24, 1959 |
| 2,941,895 | Haslam | June 21, 1960 |
| 2,995,459 | Soloway | Aug. 8, 1961 |
| 3,008,844 | Grunin et al. | Nov. 14, 1961 |